(12) United States Patent
Kawahito et al.

(10) Patent No.: US 7,979,853 B2
(45) Date of Patent: *Jul. 12, 2011

(54) COMPILER DEVICE, METHOD, PROGRAM AND RECORDING MEDIUM

(75) Inventors: Motohiro Kawahito, Sagamihara (JP); Hideaki Komatsu, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 827 days.

This patent is subject to a terminal disclaimer.

(21) Appl. No.: 12/019,446

(22) Filed: Jan. 24, 2008

(65) Prior Publication Data

US 2008/0184213 A1    Jul. 31, 2008

Related U.S. Application Data

(63) Continuation of application No. 10/793,370, filed on Mar. 4, 2004, now Pat. No. 7,383,544.

(30) Foreign Application Priority Data

Mar. 4, 2003    (JP) ................................ 2003-056612

(51) Int. Cl.
    *G06F 9/45*    (2006.01)
(52) U.S. Cl. ................. 717/161; 717/152; 717/154
(58) Field of Classification Search .................. None
    See application file for complete search history.

(56) References Cited

U.S. PATENT DOCUMENTS

| | | | |
|---|---|---|---|
| 4,656,582 A | 4/1987 | Chaitin et al. | |
| 4,763,255 A | 8/1988 | Hopkins et al. | |
| 5,202,995 A | 4/1993 | O'Brien | |
| 5,557,761 A | 9/1996 | Chan et al. | |
| 5,625,835 A | 4/1997 | Ebcioglu et al. | |
| 5,689,672 A | 11/1997 | Witt | |
| 5,903,761 A | 5/1999 | Tyma | |
| 5,999,737 A | 12/1999 | Srivastava | |
| 6,006,033 A | 12/1999 | Heisch | |
| 6,026,485 A | 2/2000 | O'Connor et al. | |
| 6,059,840 A | 5/2000 | Click | |
| 6,260,190 B1 | 7/2001 | Ju | |
| 6,487,715 B1 | 11/2002 | Chamdani et al. | |
| 6,594,824 B1 | 7/2003 | Volkonsky et al. | |
| 6,675,374 B2 | 1/2004 | Pieper et al. | |

(Continued)

OTHER PUBLICATIONS

Knoop et al., "Optimal Code Motion: Theory and Practice," Germany, 1994.

*Primary Examiner* — Tuan Q Dam
*Assistant Examiner* — Zheng Wei
(74) *Attorney, Agent, or Firm* — Scully, Scott, Murphy & Presser, P.C.; William Stock, Esq.

(57) ABSTRACT

Compiler device optimizes a program by changing an order of executing instructions. The device includes: a replaceability determination unit which determines whether a first instruction included in a first instruction sequence and a second instruction included in a second instruction sequence executed after the first instruction sequence can be replaced with a common processing instruction group including a common processing instruction for processing at least respective parts of processings by the first and second instructions together; a common processing instruction group generation unit which generates a common processing instruction group in the first instruction sequence, in place of the first instruction, when the replaceability determination unit determines the first and second instructions to be replaceable; and an instruction insertion unit which inserts the second instruction into a third instruction sequence that is an instruction sequence other than the first instruction sequence and is executed before the second instruction sequence.

19 Claims, 15 Drawing Sheets

U.S. PATENT DOCUMENTS

| | | |
|---|---|---|
| 6,675,376 B2 | 1/2004 | Ronen et al. |
| 6,807,622 B1 | 10/2004 | McGrath |
| 6,839,895 B1 | 1/2005 | Ju et al. |
| 6,889,318 B1 | 5/2005 | Wichman |
| 6,920,546 B2 | 7/2005 | Gochman et al. |
| 7,103,882 B2 | 9/2006 | Kawahito |
| 7,143,403 B2 | 11/2006 | Hank |
| 2004/0015878 A1 | 1/2004 | Saito |

Fig. 9

```
bit0:load32(a+8)  ············  BELONGING GROUP {11}
    bit1:load32(a+12) ···  BELONGING GROUP {11}
```

|  | N-COMP | X-COMP | G-N-COMP | G-X-COMP |
|---|---|---|---|---|
| BASIC BLOCK 800 | 01 | 01 | 11 | 11 |
| BASIC BLOCK 820 | 00 | 00 | 00 | 00 |
| BASIC BLOCK 810 | 10 | 10 | 11 | 11 |

FIG. 13
(a)
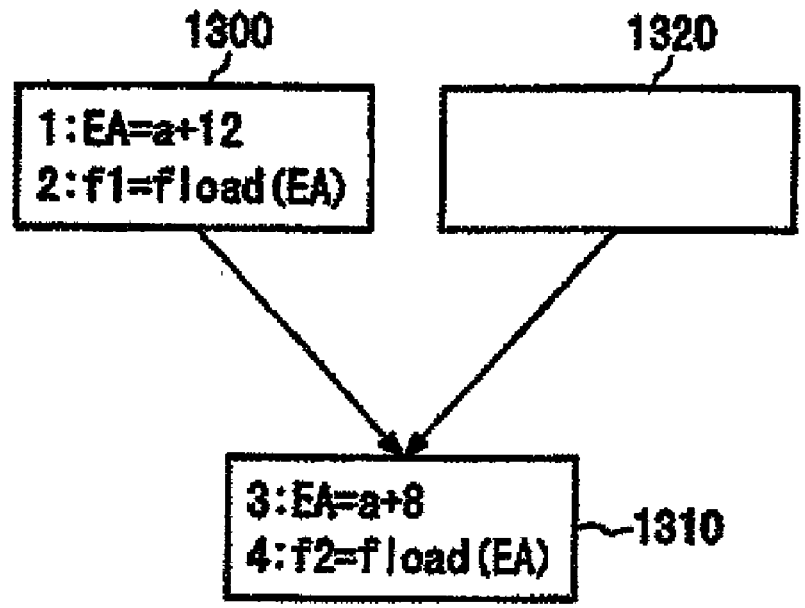
(b)
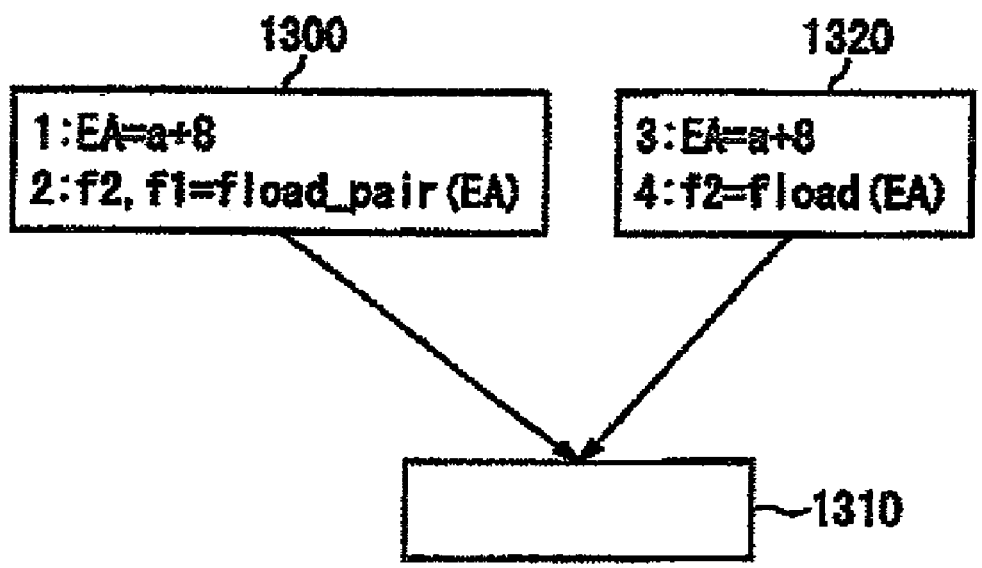

FIG. 14
(a)
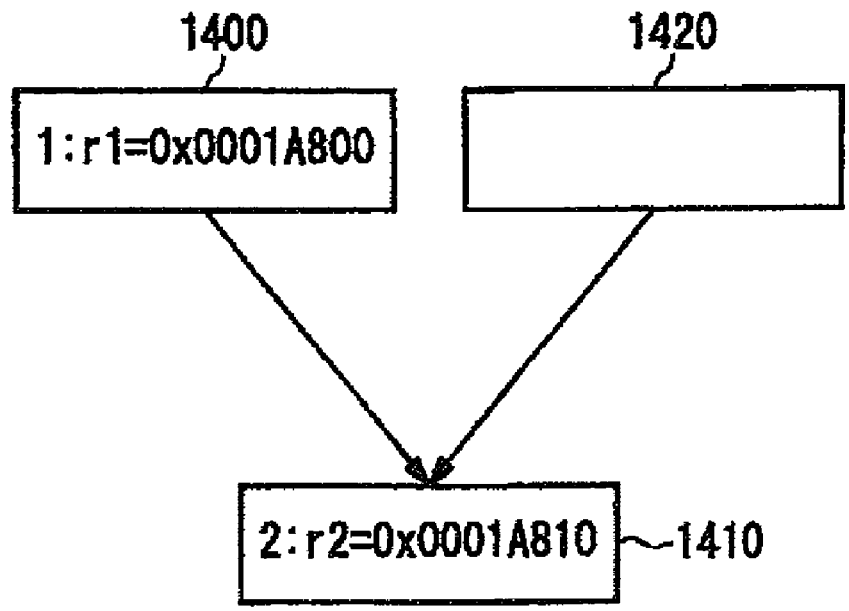
(b)
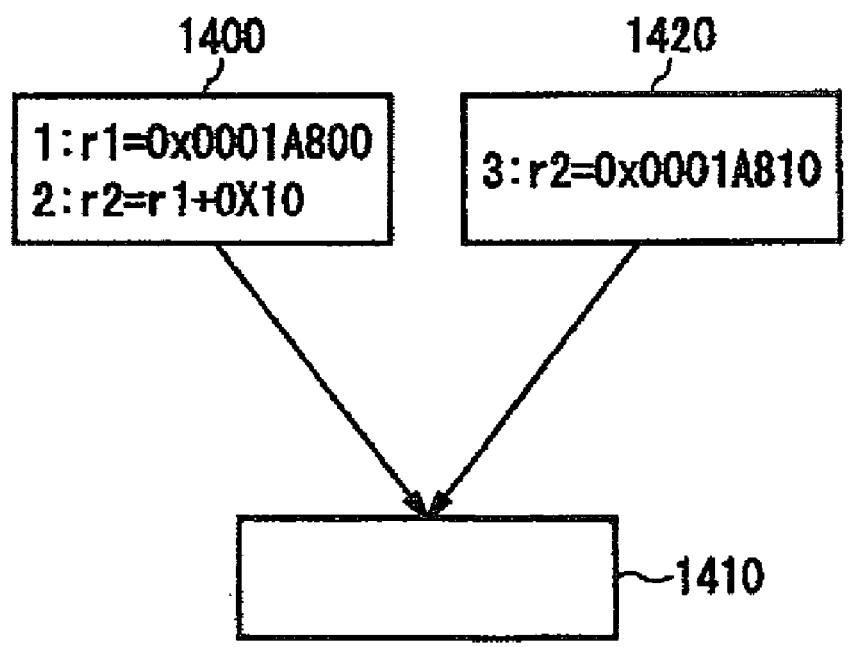

FIG. 15
(a)
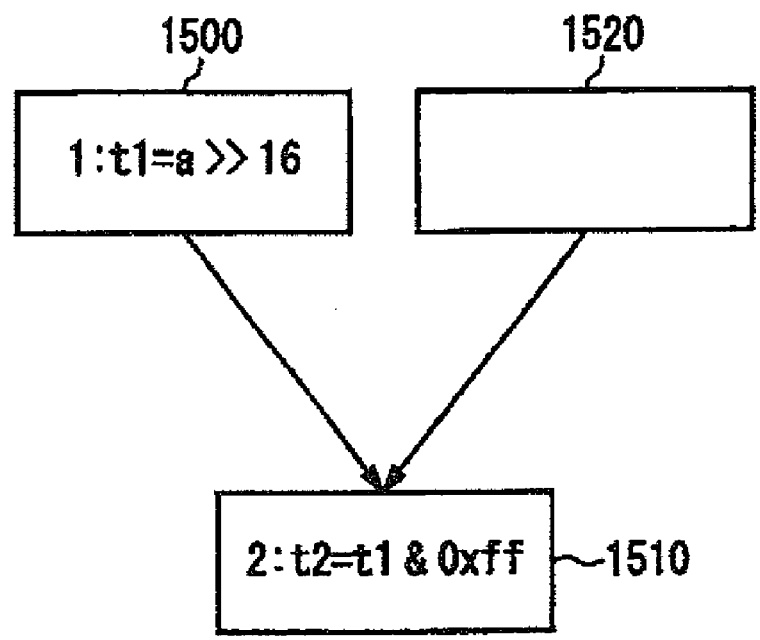
(b)
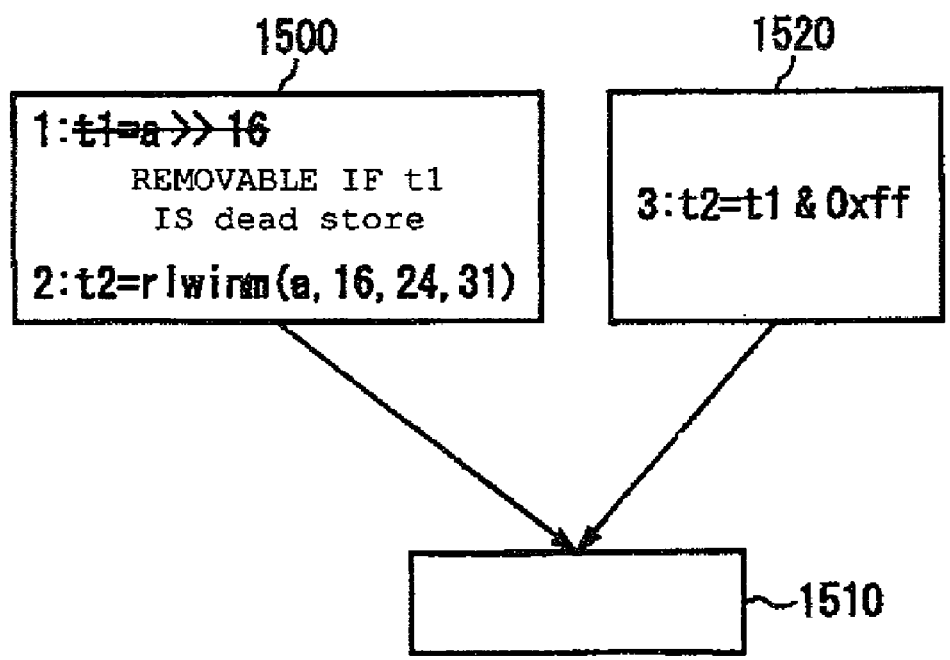

COMPILER DEVICE, METHOD, PROGRAM AND RECORDING MEDIUM

CROSS-REFERENCE TO RELATED APPLICATIONS

This application is a continuation of U.S. patent application Ser. No. 10/793,370, filed Mar. 4, 2004 now U.S. Pat. No. 7,383,544.

FIELD OF INVENTION

The present invention is directed to the field of compiling. More particularly, it is directed to compiling which optimize a program by changing an order of executing instructions.

BACKGROUND OF THE INVENTION

In a conventional compiler, as a technology for reducing the number of times of instruction executions, a technology of removing partial redundancy is used (refer to nonpatent literature 1). According to this technology, for example, when an instruction executed at a merger destination of control flows and an instruction executed at one of merger origins of the control flows are redundant, the instruction at the merger destination is moved to the other of the merger origins and thus the number of the instruction executions can be reduced.

[Nonpatent Literature 1]
J. Knoop, O. Ruthing and B. Steffen, Lazy code motion, In PLDI '92, p. 224-234, 1992. Japanese title "lazy code movement"

However, according to the foregoing technology, while the number of times of executing respective instructions can be reduced, the instructions cannot be moved to other basic blocks in order to generate a synthesis instruction for efficiently executing processings from a plurality of instructions by synthesis. For example, in a computer of a 64-bit architecture, when two load instructions for reading 32-bit data from addresses adjacent to each other are executed in two basic blocks, respectively, it was impossible to perform optimization in which one 32-bit load instruction is moved to another basic block in order to synthesize the two 32-bit load instructions to obtain a 64-bit load instruction.

SUMMARY OF THE INVENTION

Consequently, an aspect of the present invention is to provide a compiler device, a compiling method, a compiler program and a recording medium, which are capable of solving the foregoing problem. This aspect is achieved by combining characteristics described in independent claims in scope of claims. Moreover, dependent claims prescribe further advantageous concrete examples of the present invention.

Specifically, according to a first aspect of the present invention, a compiler device which optimizes a program by changing an order of executing instructions, a compiling method by use of the compiler device, a compiler program which allows a computer to function as the compiler device and a recording medium recording the compiling program are provided. To be more specific, in the compiler device, included are: a replaceability determination unit which determines whether or not a first instruction included in a first instruction sequence and a second instruction included in a second instruction sequence executed after the first instruction sequence can be replaced with a common processing instruction group including a common processing instruction for processing at least respective parts of processings by the first and second instructions together; a common processing instruction group generation unit which generates a common processing instruction group in the first instruction sequence, in place of the first instruction, when the replaceability determination unit determines the first and second instructions to be replaceable; and an instruction insertion unit which inserts the second instruction into a third instruction sequence that is an instruction sequence other than the first instruction sequence and is executed before the second instruction sequence.

Note that, in the foregoing summary of the invention, not all necessary characteristics of the present invention are enumerated. Subcombinations of these characteristic groups may also become the inventions.

BRIEF DESCRIPTION OF THE DRAWINGS

For a more complete understanding of the present invention and the advantages thereof, reference is now made to the following description taken in conjunction with the accompanying drawings.

FIG. 9 shows an example of a result of applying processing of S300 to a program to be compiled.
FIG. 13($a$) shows an example of a program to be compiled according to a first modified example.
FIG. 13($b$) shows a result of optimizing the program to be compiled according to the first modified example.
FIG. 14($a$) shows an example of a program to be compiled according to a second modified example.
FIG. 14($b$) shows a result of optimizing the program to be compiled according to the second modified example.
FIG. 15($a$) shows an example of a program to be compiled according to a third modified example.
FIG. 15($b$) shows a result of optimizing the program to be compiled according to the third modified example.

DETAILED DESCRIPTION OF THE INVENTION

The present invention provides a compiler device, a compiling method, a compiler program and a recording medium, which are capable of solving the foregoing problem. Specifically, example embodiment of the present invention include, a compiler device optimizes a program by changing an order of executing instructions, a compiling method by use of the compiler device, a compiler program which allows a computer to function as the compiler device and a recording medium recording the compiling program are provided.

In an embodiment of a compiler device, the compiler device includes: a replaceability determination unit which determines whether or not a first instruction included in a first instruction sequence and a second instruction included in a second instruction sequence executed after the first instruction sequence can be replaced with a common processing instruction group including a common processing instruction for processing at least respective parts of processings by the first and second instructions together; a common processing instruction group generation unit which generates a common processing instruction group in the first instruction sequence, in place of the first instruction, when the replaceability determination unit determines the first and second instructions to be replaceable; and an instruction insertion unit which inserts the second instruction into a third instruction sequence that is an instruction sequence other than the first instruction sequence and is executed before the second instruction sequence.

The present invention will be described below according to example embodiments of the invention. However, the embodiments described below are not ones limiting the invention according to claims. Moreover, all combinations of characteristics described in the embodiments are not necessarily essential to a solving means of the invention.

Figure 1:
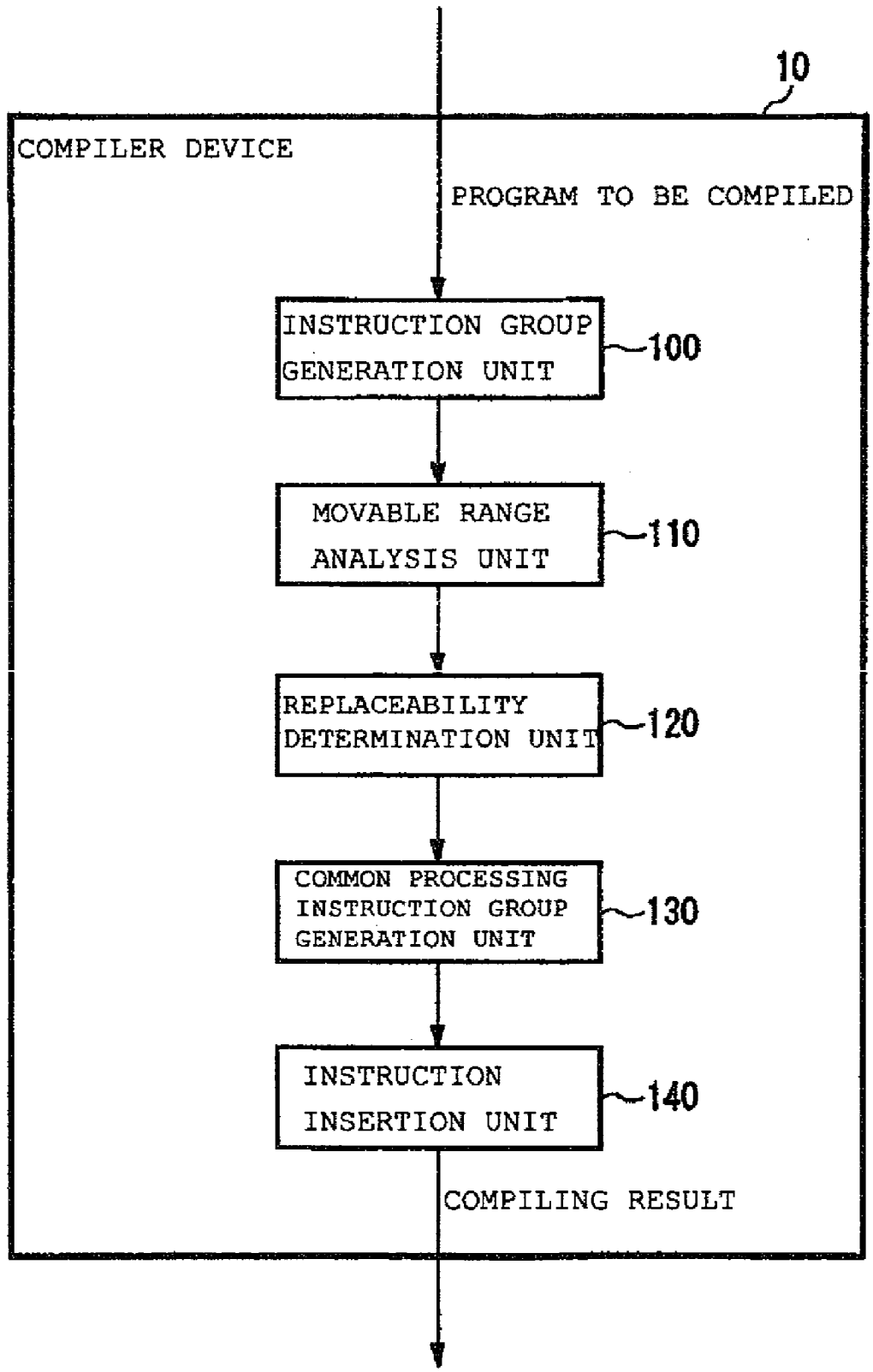
FIG. 1 shows a functional block diagram of a compiler device 10.

FIG. 1 shows a functional block diagram of a compiler device 10. The compiler device 10 is designed to optimize a program by changing an order of executing instructions and includes: an instruction group generation unit 100; a movable range analysis unit 110; a replaceability determination unit 120; a common processing instruction group generation unit 130; and an instruction insertion unit 140.

The instruction group generation unit 100 generates instruction group information showing candidates of instructions that can be replaced with a common processing instruction group. As an example, the instruction group generation unit 100 generates instruction group information showing that a 32-bit load instruction for reading first 32-bit data from a memory and a 32-bit load instruction for reading second data adjacent to the first data can be replaced with a 64-bit load instruction that is the common processing instruction group. Moreover, upon receiving a program to be compiled, the instruction group generation unit 100 sends the program to the movable range analysis unit 110.

Note that the state where the first and second data are adjacent to each other means a state where the first and second data are stored in contiguous regions on the memory. Accordingly, in this case, the first and second data are preferably stored in regions which never cross a word or doubleword boundary which is a read unit to a register, more specifically, regions sequentially divided from address 0 of the memory by a word or doubleword unit. As an example, the word unit means 64 bits.

Upon receiving the program to be compiled, the movable range analysis unit 110 analyzes, as to respective instructions of the program, an instruction movable range within which the instructions can be moved while obtaining the same execution result of the program without increasing the number of times of executing the instructions. Thereafter, the movable range analysis unit 110 sends the analysis result together with the received program to the replaceability determination unit 120. For example, the movable range analysis unit 110 may analyze the instruction movable range by performing processing of Busy Code Motion described in non-patent literature 1.

To be more specific, for example, by transferring an instruction to a spot where the instruction is executed more in advance, the instruction is found to be redundant and thus is removed because of an already existing instruction in the spot in the technology of removing partial redundancy. For proper application of this removal technology, the movable range analysis unit 110 analyzes a movable range of every instruction in the program by transferring the instruction assuming that any instruction which performs the same processing as that of the instruction is redundant.

The replaceability determination unit 120 determines whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together. Thereafter, the replaceability determination unit 120 sends the program together with the determination result to the movable range analysis unit 110.

To be more specific, when the instruction group generation unit 100 determines that the first and the second instructions are candidates of instructions that can be replaced with the common processing instruction group and the first instruction is within a movement range of the second instruction, which is analyzed by the movable range analysis unit 110, the replaceability determination unit 120 determines the first and the second instructions to be replaceable with the common processing instruction group.

For example, when the number of instructions in the common processing instruction group is less than the number of instructions in the case of executing the first and the second instructions separately, as an example, when the first and the second data can be read out by one instruction, the replaceability determination unit 120 determines the first and the second instructions to be replaceable with the common processing instruction group. The case where the first and the second data can be read out by one instruction is not necessarily a case where the first and the second data are contiguous on the memory but may be a case where, for example, the both data are within the same word.

Moreover, besides the above, the replaceability determination unit 120 may also determine the first and the second instructions to be replaceable with the common processing instruction group when an execution time required for executing the common processing instruction group from its start till its end is shorter than an execution time required in the case of executing the first and second instructions separately.

Here, the instruction sequence means a set of instructions including at least one instruction. For example, the instruction sequence may be a basic block that is a set of instructions in which an instruction other than instructions arranged at the head and the last of the sequence does not become a branch destination of a branch instruction or a branch source thereof or may be a super block in which an instruction other than instructions arranged at the head and the last of the sequence does not become a branch destination of a branch instruction. Moreover, the instruction sequence may include an influx point of a control flow. In other words, the instruction sequence means a set of instructions including continuously executed portions.

Moreover, the instruction means an instruction in an intermediate language expressing a program to be optimized. As an example, the instruction is a bytecode in the Java JAVA (registered trademark) language, RTL (Register Transfer Language) or a quadruple representation. In place of the above, the instruction may be an instruction that can be executed by a computer or may be a sentence in a source code of a program. Moreover, the instruction may be a pair of plural instructions performing a single processing.

When the replaceability determination unit 120 determines the instructions to be replaceable, the common processing instruction group generation unit 130 generates a common processing instruction group in the first instruction sequence in place of the first instruction. The instruction insertion unit 140 inserts the second instruction into a third instruction sequence that is an instruction sequence in the first instruction sequence and is executed before the second instruction sequence.

In such a manner, when the first instruction is within the movement range of the second instruction, which is analyzed by the movable range analysis unit 110, the compiler device 10 can convert the first and second instructions into the common processing instruction group having a shorter execution time. Consequently, while maintaining a state where the second instruction is not redundantly executed, the execution time of the program can be optimized to be shorter.

Note that, when the number of instructions in the common processing instruction group is smaller than the number of instructions in the case of executing the first and the second instructions separately, the replaceability determination unit 120 may determine the first and the second instructions to be replaceable with the common processing instruction group. In this case, the compiler device 10 can optimize a size of a program as a result of compiling to be smaller.

Figure 2:
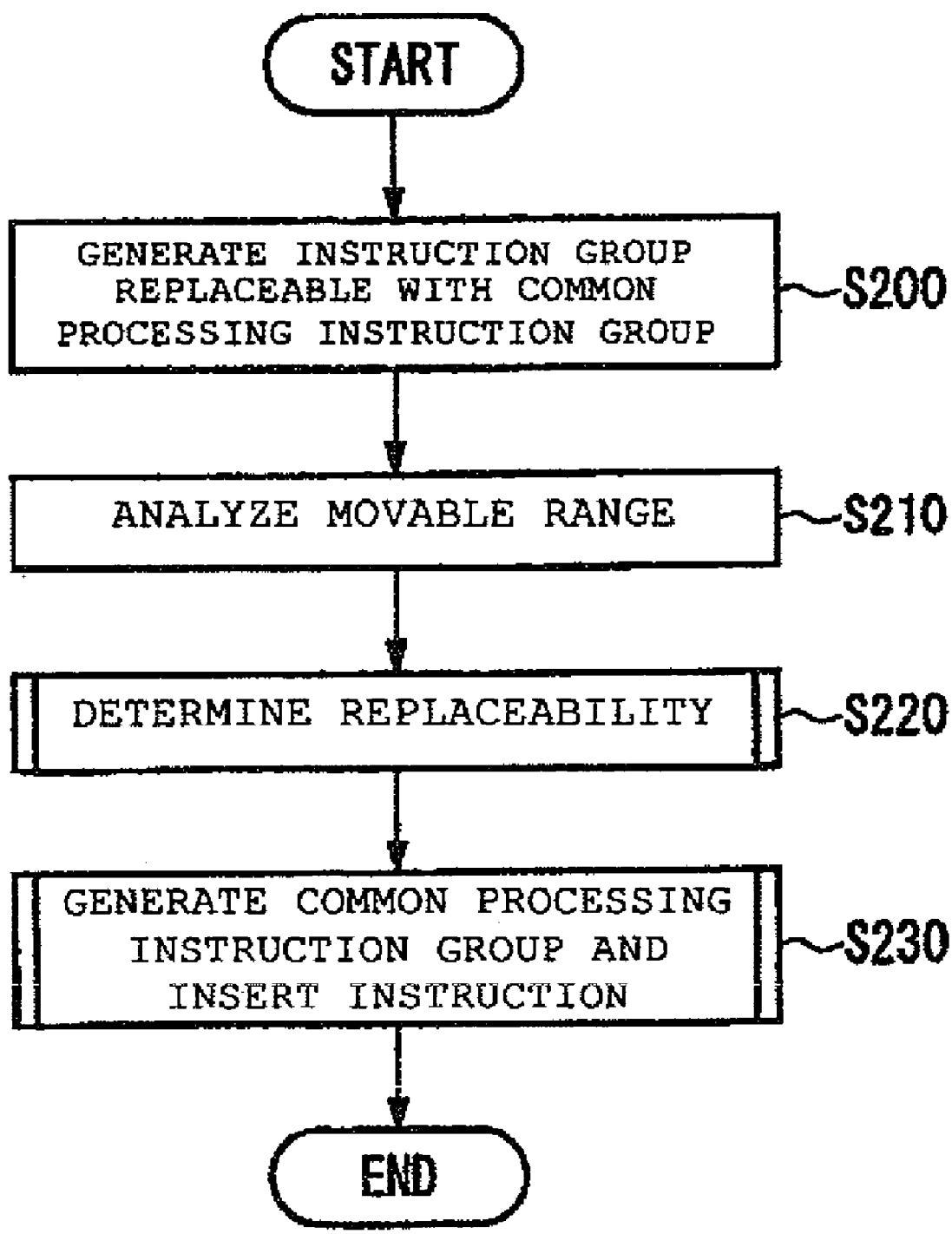
FIG. 2 shows a flowchart of the compiler device 10.

FIG. 2 shows a flowchart of the compiler device 10. The instruction group generation unit 100 generates instruction group information showing candidates of instructions that can be replaced with the common processing instruction group (S200). As an example of a data structure, the instruction group generation unit 100 may use a bit-vector system. For example, the instruction group generation unit 100 associates the 32-bit load instruction for reading the first data with a first bit of a bit vector and associates the 32-bit load instruction for reading the second data with a second bit of the bit vector. In this case, by associating the 64-bit load instruction with a bit vector {1, 1}, the instruction group generation unit 100 can indicate that the 32-bit load instruction for reading the first data and the 32-bit load instruction for reading the second data belong to the same instruction group. Thus, a calculation of manipulating a set of instructions, for example, a calculation of a product set and the like can be speeded up.

Subsequently, as to each instruction of the program, for example, the second instruction, the movable range analysis unit 110 analyzes the movement range of the second instruction within which the second instruction can be moved while obtaining the same execution result of the program and without increasing the number of times of executing the second instructions (S210). Thereafter, when the first instruction is within the movement range of the second instruction, which is analyzed by the movable range analysis unit 110, the replaceability determination unit 120 determines whether or not the first and second instructions can be replaced with the common processing instruction group (S220). Accordingly, when the replaceability determination unit 120 determines the instructions to be replaceable, the common processing instruction group generation unit 130 generates the common processing instruction group in the first instruction sequence in place of the first instruction and the instruction insertion unit 140 inserts the second instruction into the third instruction sequence (S230).

Figure 3:
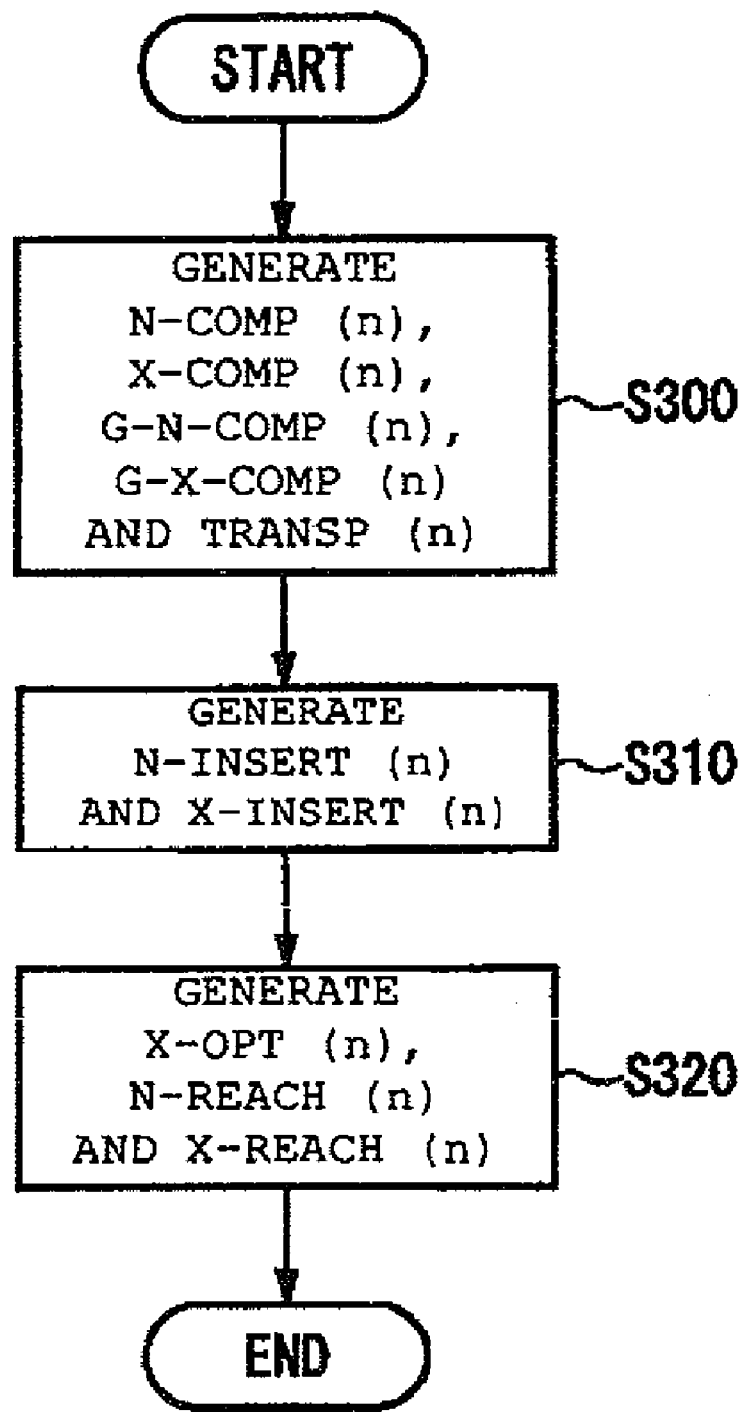
FIG. 3 shows a flowchart of S220 in FIG. 2.

FIG. 3 shows a flowchart of S220 in FIG. 2. For each basic block, the replaceability determination unit 120 performs the following processing. The replaceability determination unit 120 generates an instruction set N-COMP (n) that can be moved first in the basic block n (S300). Thereafter, as to the instruction determined to be replaceable with the common processing instruction group in S200 among instructions included in N-COMP (n), the replaceability determination unit 120 selects an instruction group to which the instruction belongs. The replaceability determination unit 120 sets all instructions belonging to the selected instruction group to be G-N-COMP (n).

Similarly, the replaceability determination unit 120 generates an instruction set X-COMP (n) that can be executed lastly in the basic block n. Thereafter, as to the instruction determined to be replaceable with the common processing instruction group in S200 among instructions included in X-COMP (n), the replaceability determination unit 120 selects an instruction group to which the instruction belongs. The replaceability determination unit 120 sets all instructions belonging to the selected instruction group to be G-X-COMP (n). Furthermore, the replaceability determination unit 120 generates an instruction set TRANSP (n) that can be moved by passing through the basic block n.

In each basic block, the replaceability determination unit 120 generates an instruction set N-INSERT (n) that is inserted first in the basic block n and an instruction set X-INSERT (n) that should be executed lastly in the basic block n (S310). By use of various technologies for removing partial redundancy, the compiler device 10 may generate N-INSERT (n) and X-INSERT (n). As an example, the replaceability determination unit 120 performs processing disclosed in FIG. 7 of nonpatent literature 1 by use of G-N-COMP (n) in place of N-COMP (n) and G-X-COMP (n) in place of X-COMP (n).

Here, the technology described in nonpatent literature 1 is a technology of analyzing X-INSERT (n) and N-INSERT (n) which are movement destinations to which each instruction is moved so as to be executed as late as possible in order to minimize live range of values stored in each variable while maintaining a state of removing redundancy of instructions. Note that the live range means a range from substitution of a value for a variable up to an instruction for referring to the value at last. In the case of extending the live range, while a chance of optimization can be expanded, the number of values to be retained is increased at the same time. Accordingly, sometimes, there arises a case of requiring more registers.

Meanwhile, according to this embodiment, by use of G-N-COMP (n) in place of N-COMP (n) in nonpatent literature 1 and G-X-COMP (n) in place of X-COMP (n) therein, the replaceability determination unit 120, when the instruction is replaceable with the common processing instruction group, analyzes a movement destination for execution of the instruction in the basic block in which other instructions belonging to the instruction group exist and, when the instruction is not replaceable with the common processing instruction group, analyzes a movement destination where the instruction is executed as late as possible. Accordingly, the replaceability determination unit 120 generates an analysis result as X-INSERT (n) and N-INSERT (n).

Based on N-INSERT (n) and X-INSERT (n), the replaceability determination unit 120 further generates an instruction set X-OPT (n) to be inserted last in the basic block n (S320). For example, the replaceability determination unit 120 generates X-OPT (n) by the following equation.

$$X\text{-}OPT(n) = (N\text{-}INSERT(n).\text{andgate. }TRANSP(n)).$$
$$\text{orgate. } X\text{-}INSERT(n)$$

Moreover, as a result of inserting instructions included in X-OPT (n) into the basic block n, the replaceability determination unit 120 generates N-REACH (n) and X-REACH (n) which indicate sets of instructions possibly removed as redundant. For example, the replaceability determination unit 120 calculates N-REACH (n) as a product set of X-REACH in all basic blocks to be executed immediately before the basic block n. Accordingly, the replaceability determination unit 120 generates X-REACH (n) by the following equation.

X-REACH (n)=(N-REACH(n).andgate. TRANSP(n). orgate. X-OPT(n)

Note that the method for determining, by the replaceability determination unit 120, the first and the second instructions to be replaceable with the common processing instruction group is not limited to the one shown in the drawings of the present invention. For example, the replaceability determination unit 120 may determine the range in the program, within which the respective first and second instructions can be moved, by use of another analysis method for optimizing the program. Specifically, the replaceability determination unit 120 determines the first and second instructions to be replaceable with the common processing instruction group when the range within which the second instruction can be moved while guaranteeing the same execution result of the program overlaps with the range within which the first instruction can be moved while guaranteeing the same execution result of the program.

Figure 4:
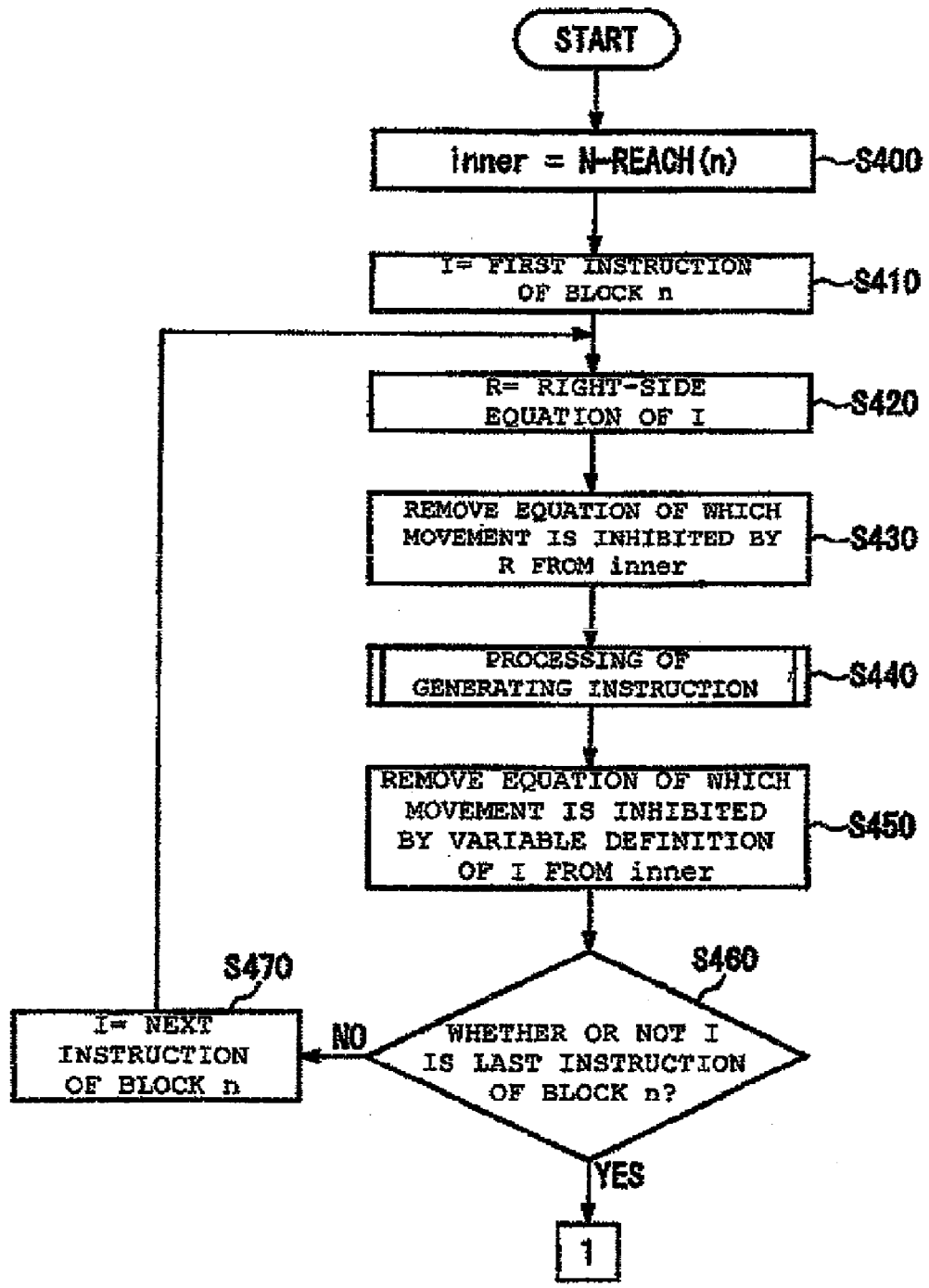
FIG. 4 shows a flowchart of S230 in FIG. 2.

FIG. 4 shows a flowchart of S230 in FIG. 2. The compiler device 10 performs optimization in the basic block by processing shown in the flowcharts of FIGS. 4 and 5 and performs optimization between the basic blocks, in which the instruction is moved to another basic block, by processing shown in FIGS. 6 and 7.

The common processing instruction group generation unit 130 substitutes N-REACH (n) for an instruction candidate set inner to be optimized (S400). Thereafter, the common processing instruction group generation unit 130 substitutes a first instruction of the block n for a variable I (S410). Subsequently, the common processing instruction group generation unit 130 sets a right-side equation of I to be R (S420). Thereafter, the common processing instruction group generation unit 130 removes an instruction whose movement is inhibited by R from inner (S430). Subsequently, the common processing instruction group generation unit 130 and the instruction insertion unit 140 perform processing of moving the instructions (S440).

Subsequently, the common processing instruction group generation unit 130 removes an instruction whose movement is inhibited by a variable definition of I from inner (S450). When I is not the last instruction of the block n (S460:NO), the common processing instruction group generation unit 130 sets I as a next instruction of I in the block n (S470) and moves I to the processing of S420. When I is the last instruction of the block n (S460:YES), the common processing instruction group generation unit 130 moves to the processing of FIG. 6.

Figure 5:
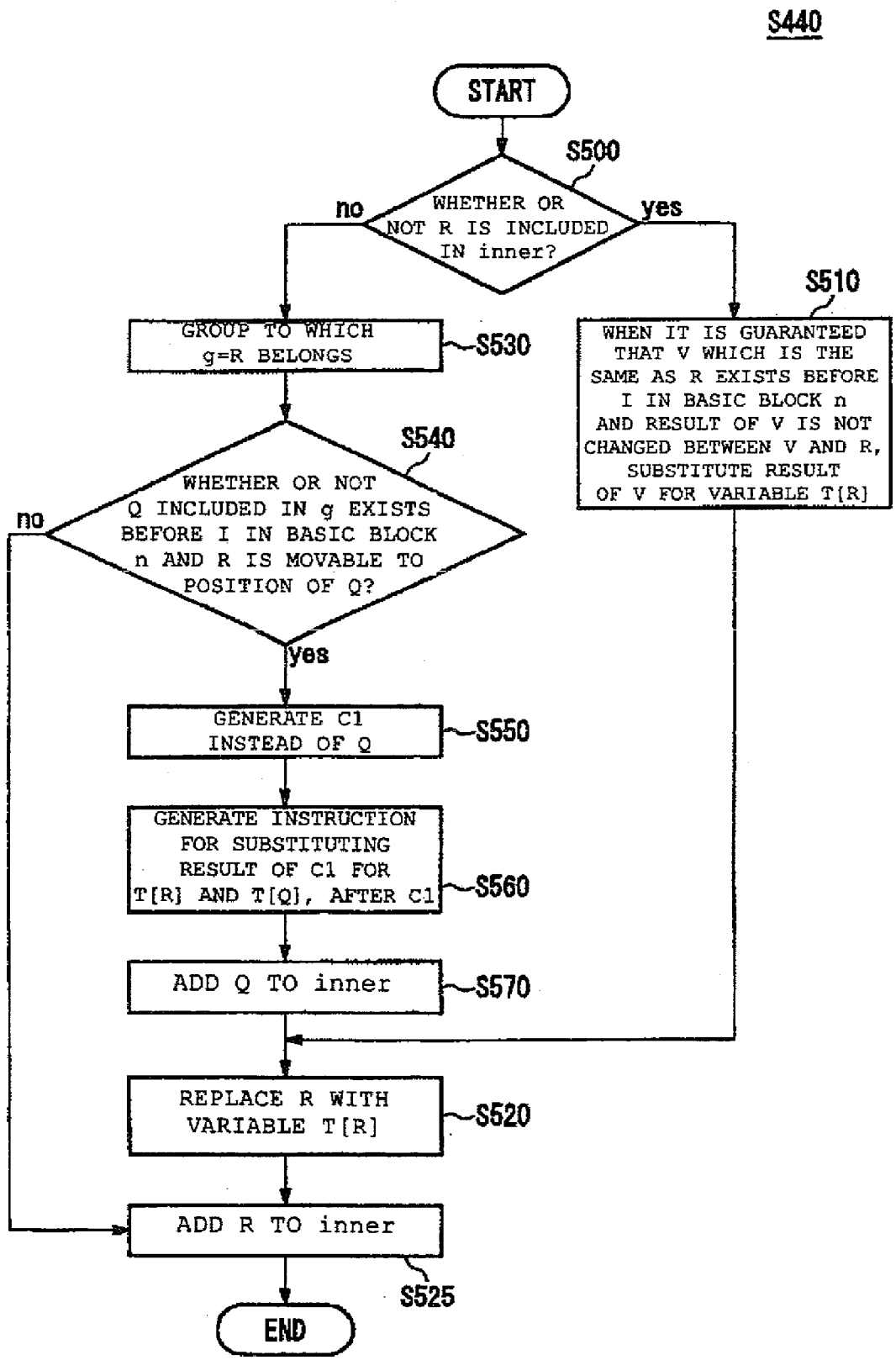
FIG. 5 shows a flowchart of S440 in FIG. 4.

FIG. 5 shows a flowchart of S440 in FIG. 4. In the case where the instruction R is included in inner (S500:YES), when it can be guaranteed that there is an instruction V, that is the same instruction as R, before the instruction I in the block to be optimized and that a result of the instruction V is not changed between the instructions V and R, the instruction insertion unit 140 substitutes the result of the instruction V for a temporary variable T [R] (S510). Thereafter, the instruction insertion unit 140 replaces the instruction R with the variable T [R] (S520), adds the instruction R into inner (S525) and finishes the processing.

Meanwhile, when the instruction R is not included in inner (S500:NO), the common processing instruction group generation unit 130 sets g as a group to which R belongs (S530). When an instruction Q included in g is before I in the block n and R can be moved to a position of the instruction Q (S540:YES), the common processing instruction group generation unit 130 generates, in place of the instruction Q, an instruction C1 that is a common processing instruction for processing together at least respective parts of the processings by the instructions P and R (S550).

Subsequently, the common processing instruction group generation unit 130 generates, after C1, an instruction for substituting a result of the instruction C1 for the temporary variable T [R] and a temporary variable T [Q] (S560). Here, R and Q are associated with the instructions R and Q and indicate numbers inherent in the program. In other words, the compiler device 10 previously ensures a region of an array variable T for temporarily storing processing results of the respective instructions in the program. By accessing the array variable T by attaching a subscript inherent in each instruction, the compiler device 10 can use the array variable as the temporary variable associated with each instruction.

Moreover, when the instruction for substituting the result of the instruction C1 for the temporary variables T [R] and T [Q] has a sign extension function, the common processing instruction group generation unit 130 may further generate a sign extension instruction after the instruction. Similarly, when the instruction for substituting the result of the instruction C1 for the temporary variables T [R] and T [Q] has a zero extension function, the common processing instruction group generation unit 130 may further generate a zero extension instruction after the instruction. Accordingly, it is possible to explicitly show that the sign extension and zero extension are performed. Thus, by application of a conventional optimization processing function as it is, a redundant sign extension instruction or a redundant zero extension instruction can be removed. Subsequently, the common processing instruction group generation unit 130 adds the instruction Q into inner (S570) and moves the processing to S520.

Meanwhile, when the instruction Q included in g is not before I in the block n or when R cannot be moved to the position of the instruction Q (S540:NO), the common processing instruction group generation unit 130 moves the processing to S525.

Figure 6:
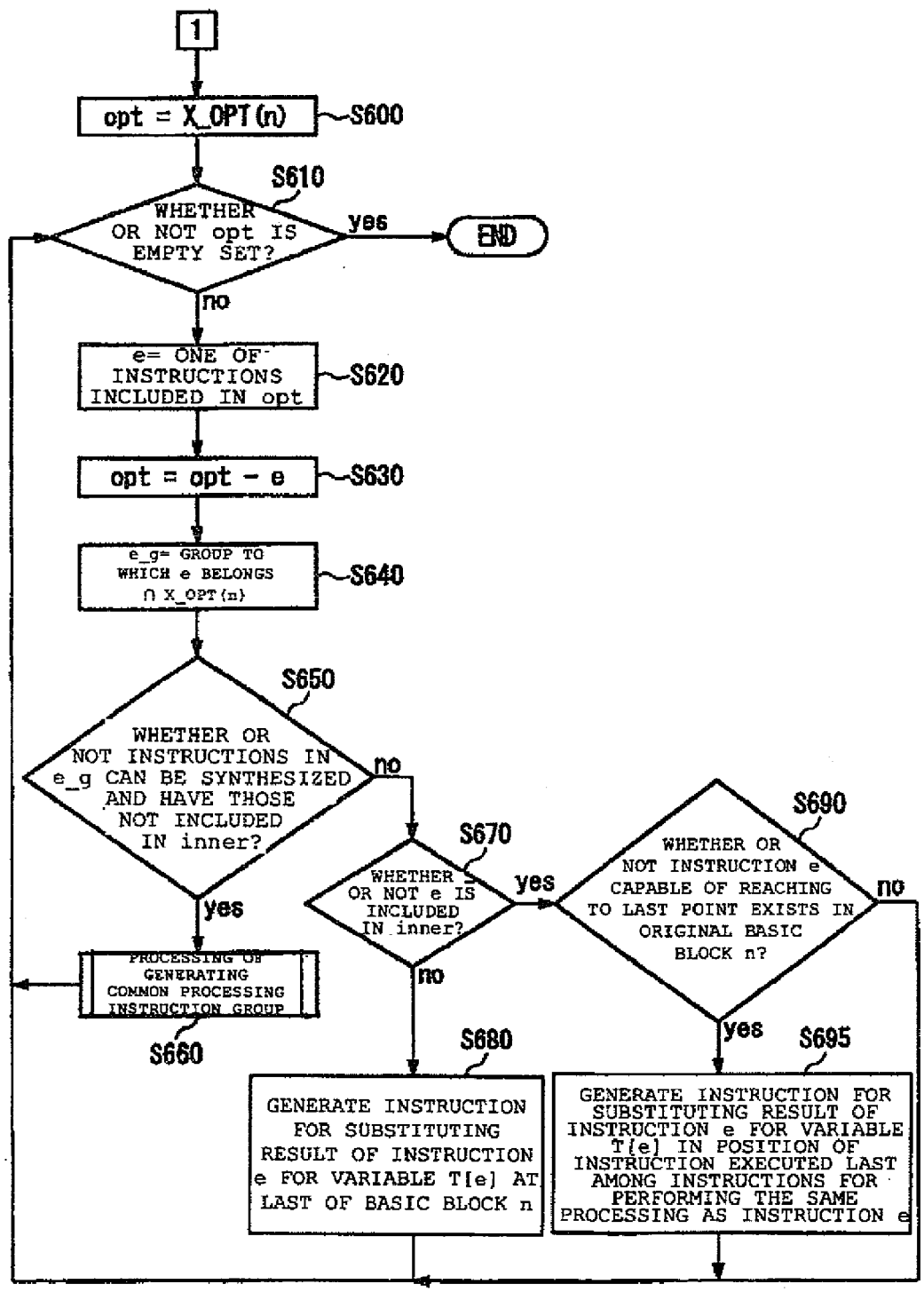
FIG. 6 shows a flowchart of a part of S230 in FIG. 2, the part following FIG. 4.

FIG. 6 shows a flowchart of a part of S230 in FIG. 2, the part following FIG. 4. The common processing instruction group generation unit 130 sets a variable opt indicating a set of instructions to be X_OPT (n) (S600). When opt is an empty set (S610:YES), the compiler device 10 finishes the processing. When opt is not an empty set (S610:NO), the common processing instruction group generation unit 130 selects one instruction e included in opt (S620) and removes the instruction e from opt (S630). Subsequently, the common processing instruction group generation unit 130 sets e_g as a product set of all instructions of a group to which the instruction e belongs and the instructions belonging to X_OPT (n) (S640).

When instructions in e_g can be synthesized and include those not included in inner (S650:YES), the common processing instruction group generation unit 130 performs processing of generating the common processing instruction group (S660) and moves the processing to S610.

Meanwhile, when the instructions in e_g cannot be synthesized and/or do not include those not included in inner (S650: NO), the instruction insertion unit 140 determines whether or not the instruction e is included in inner (S670). When the instruction e is not included in inner (S670:NO), the instruction insertion unit 140 generates an instruction for substituting a result of the instruction e for a variable T [e] in a spot lastly executed in the basic block n (S680). On the other hand, when the instruction e is included in inner (S670:YES), the instruction insertion unit 140 determines whether or not the instruction e that can be executed last in the basic block n exists in the basic block n before performing optimization of the instruction movement (S690). When there exists no instruction e that can be executed last in the basic block n (S690:NO), the instruction insertion unit 140 returns the processing to S610. When there exists the instruction e that can be executed last in the basic block n (S690:YES), the instruction insertion unit 140 generates the instruction for substituting the result of the instruction c for the variable T [e] in a position of an instruction to be executed last among instructions for performing the same processing as that of the instruction e (S695).

Figure 7:
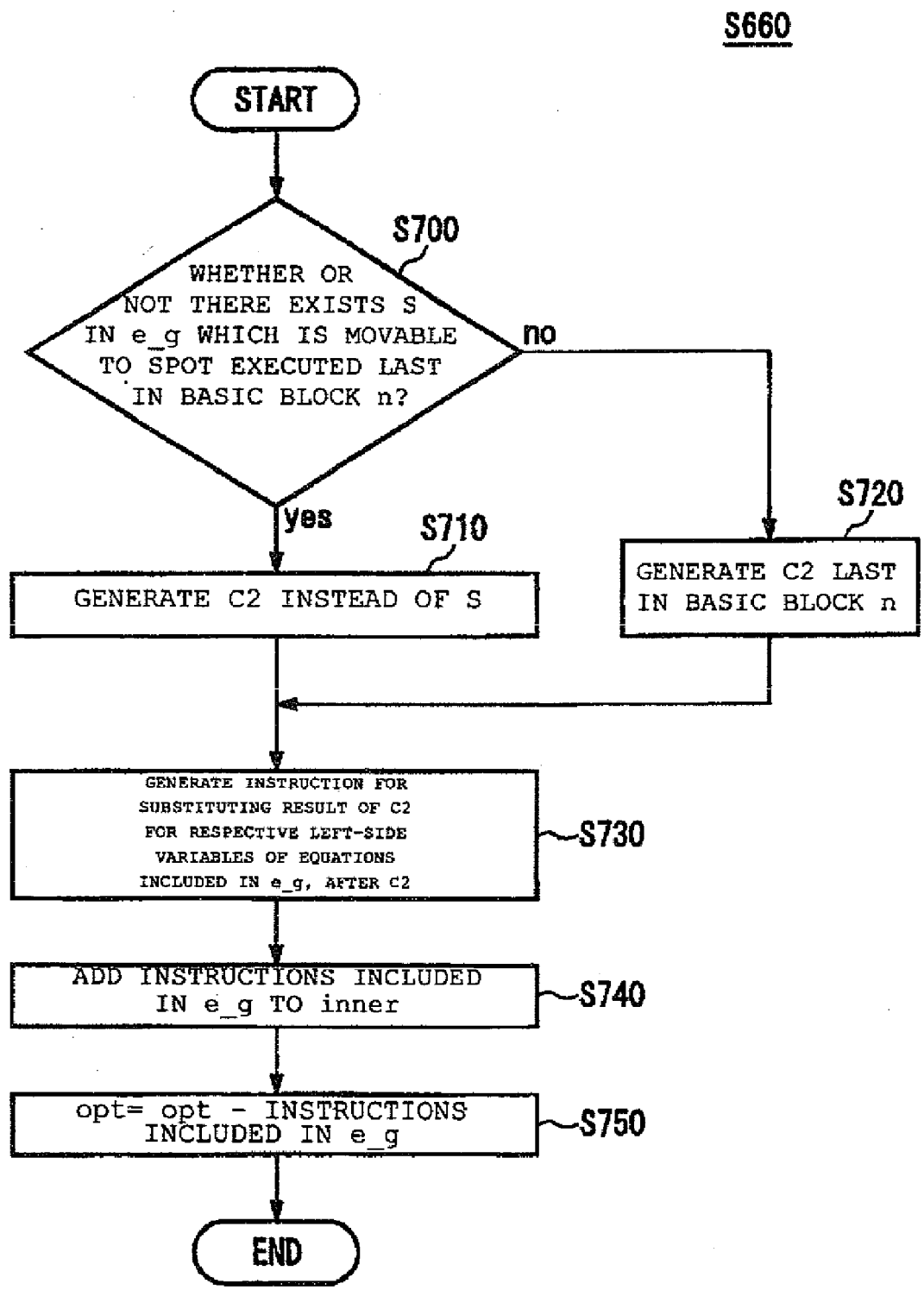
FIG. 7 shows a flowchart of S660 in FIG. 6.

FIG. 7 shows a flowchart of S660 in FIG. 6. When there exists an instruction S in e_g which can be moved to the spot to be executed last in the basic block n (S700:YES), the common processing instruction group generation unit 130 generates, in place of the instruction S, an instruction C2 that is a common processing instruction group in which the instructions included in e_g are synthesized (S710). On the other hand, when there exists no instruction S in e_g, which can be moved to the spot to be executed last in the basic block n (S700:NO), the common processing instruction group generation unit 130 generates the instruction C2 in the spot to be executed last in the basic block n (S720).

Subsequently, the common processing instruction group generation unit 130 generates, after C2, an instruction for substituting a result of C2 for respective left-side variables of the instructions included in e_g (S730). Here, when the instruction for substituting the result of C2 for the respective left-side variables of the instructions included in e_g has a sign extension function, the common processing instruction group generation unit 130 may further generate a sign extension instruction after the instruction. Similarly, when the instruction for substituting the result of C2 for the respective left-side variables of the instructions included in e_g has a zero extension function, the common processing instruction group generation unit 130 may further generate a zero extension instruction after the instruction. Accordingly, it is possible to explicitly show that the sign extension and zero extension are performed. Thus, by application of the conventional optimization processing function as it is, a redundant sign extension instruction or a redundant zero extension instruction can be removed. Subsequently, the common processing instruction group generation unit 130 adds all the instructions included in e_g into inner (S740) and removes all the instructions included in e_g from opt (S750).

In such a manner, based on X-OPT (n) in which X-INSERT (n) and N-INSERT (n) are synthesized, the common processing instruction group generation unit 130 inserts the instructions included in X-OPT (n) into the basic block n. Specifically, when the replaceability determination unit 120 determines the second instruction to be replaceable, the common processing instruction group generation unit 130 generates the common processing instruction group in the first instruction sequence in place of the first instruction. Moreover, when the replaceability determination unit 120 determines the second instruction not to be replaceable, the instruction insertion unit 140 moves the second instruction to a spot within the range analyzed by the movable range analysis unit 110, the spot having a minimum live range of values generated by the second instruction.

Figure 8:
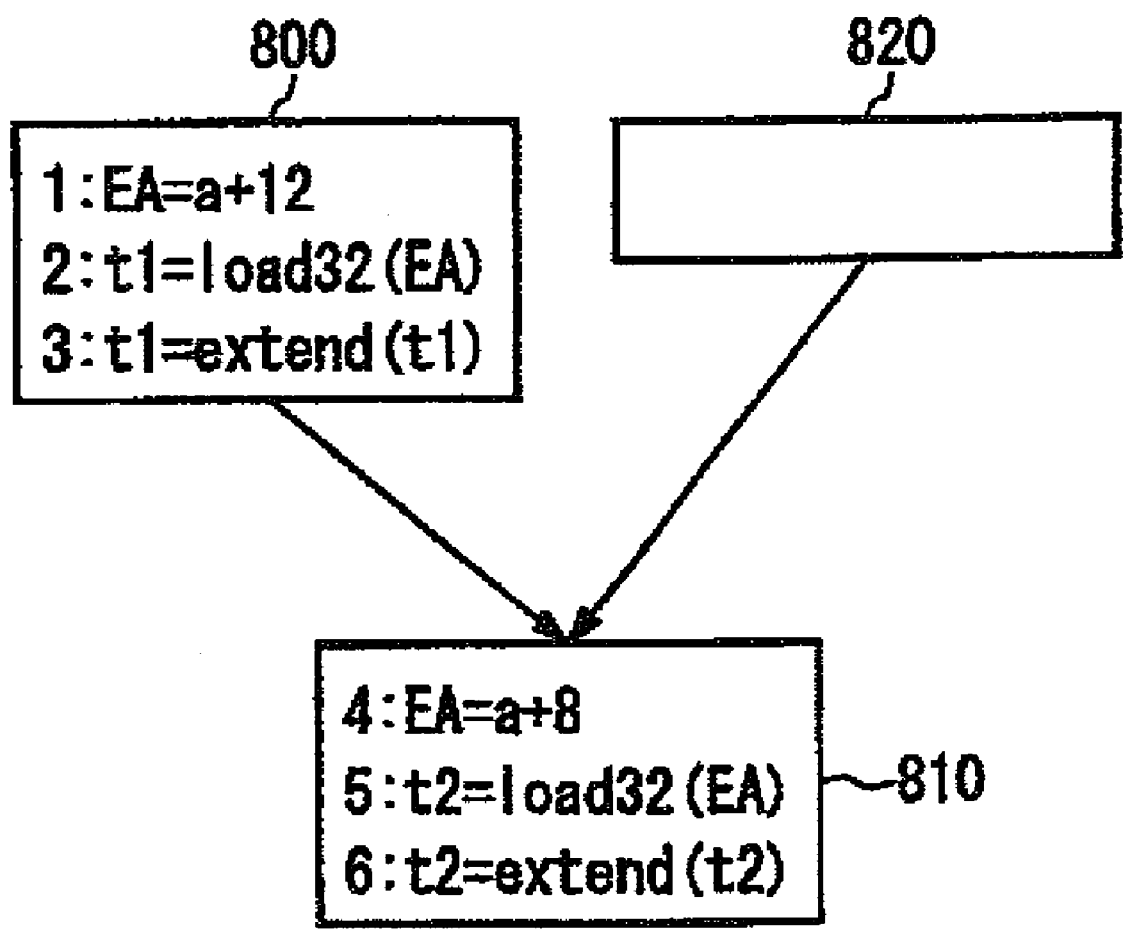
FIG. 8 shows an example of a program to be compiled.

FIG. 8 shows an example of a program to be compiled. The program to be compiled has: a basic block 800 which includes instructions of first to third lines and is an example of the first instruction sequence; a basic block 810 which includes instructions of fourth to sixth lines and is an example of the second instruction sequence; and a basic block 820 which is an example of the third instruction sequence.

The instruction of the first line is an instruction for storing a value obtained by adding 12 to a variable a in a register EA. The instruction of the second line is an instruction for reading the first 32-bit data from an address on a memory indicated by the register EA and for storing the data in a variable t1. The instruction of the third line is an instruction for performing sign extension of the values stored in the variable t1.

The instruction of the fourth line is an instruction for storing a value obtained by adding 8 to the variable a in the register EA. The instruction of the second line is an instruction for reading the second 32-bit data from an address on the memory indicated by the register EA and for storing the data in a variable t2. The instruction of the third line is an instruction for performing sign extension of the values stored in the variable t2.

As described above, according to the program shown in the drawing of the present invention, the addresses read by the instructions of the second and fifth lines are adjacent to each other and, in spite of that both of the first and the second data can be read by one 64-bit read instruction that is the common processing instruction, the instructions of the second and fifth lines are not in the same basic block. Thus, the instructions of the second and fifth lines cannot be set as the common processing instruction.

FIG. 9 shows an example of a result of applying the processing of S300 to the program to be compiled. As shown in FIG. 9, the compiler device 10 generates sets of instructions as bit-vector data. In this event, the compiler device 10 shows that an instruction "load32(a+8)" exists by setting a first bit (bit0) of the bit vector to 1. Moreover, the compiler device 10 shows that an instruction "load32(a+12)" exists by setting a second bit (bit1) of the bit vector to 1.

For example, N-COMP in the basic block 800 is the instruction "load32(a+12)" and thus the replaceability determination unit 120 generates N-COMP in the basic block 800 as {0, 1} that is the bit-vector data structure. Similarly, the replaceability determination unit 120 generates X-COMP in the basic block 800 as {0, 1}, N-COMP in the basic block 810 as {1, 0} and X-COMP in the basic block 810 as {1, 0}.

Moreover, as to an instruction determined to be replaceable with a common processing instruction group among instructions included in N-COMP (n), the replaceability determination unit 120 sets all instructions belonging to an instruction group to which the instruction belongs as G-N-COMP (n). Therefore, the replaceability determination unit 120 determines the instruction "load32(a+8)" and the instruction "load32(a+12)" to be replaceable with the common processing instruction group and thus generates G-N-COMP (n) as the bit-vector data structure {1, 1}. Similarly, the replaceability determination unit 120 generates G-X-COMP in the basic block 800 as {1, 1}, G-N-COMP in the basic block 810 as {1, 1} and G-X-COMP in the basic block 810 as {1, 1}.

Figures 10, 11:
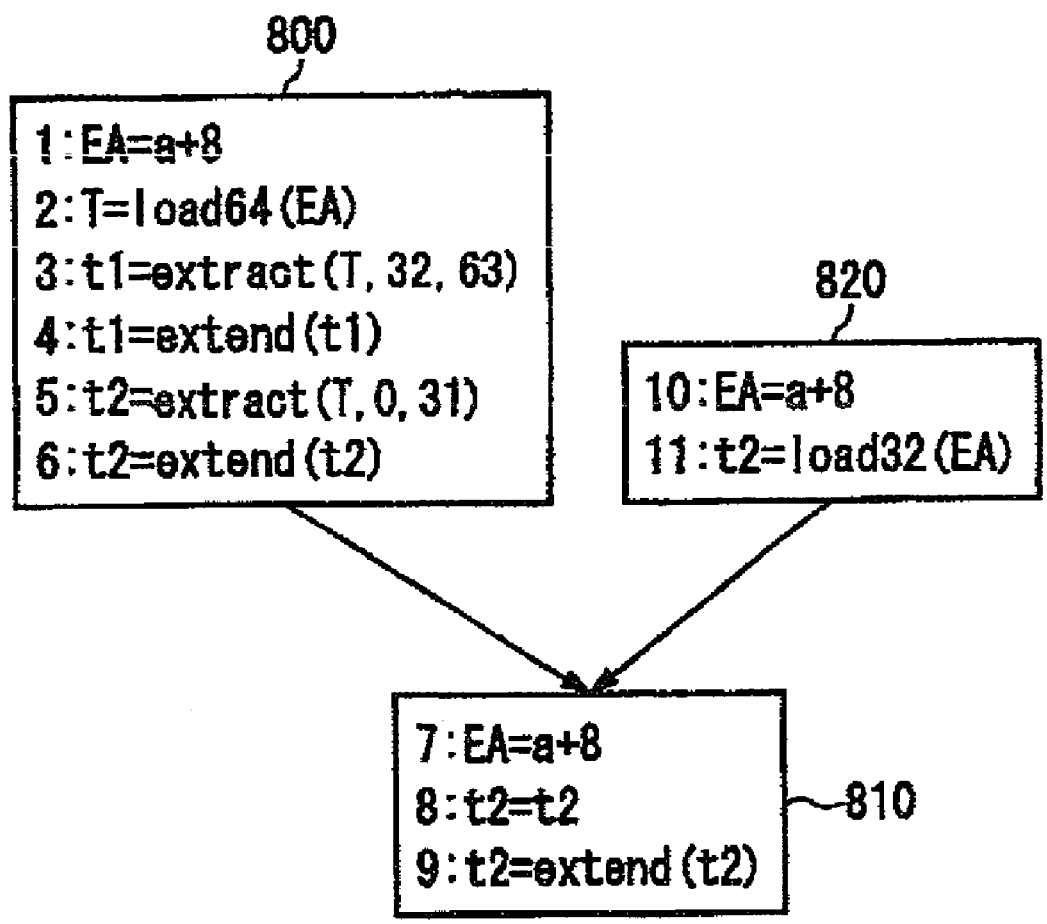
FIG. 10 shows an example of a result of further applying processing of S320 to data shown in FIG. 9.
FIG. 11 shows an example of a result of applying processing of S230 to a program to be compiled, by use of the result shown in FIG. 10.

FIG. 10 shows an example of a result of further applying the processing of S320 to the data shown in FIG. 9. The common processing instruction group generation unit 130 generates {1, 1} indicating that the instruction "load32(a+8)" and the instruction "load32(a+12)" are included as X-OPT in the basic block 800. Furthermore, the common processing instruction group generation unit 130 generates {1, 0} indicating that the instruction "load32(a+8)" is included as N-REACH in the basic block 810. Specifically, the result of FIG. 10 shows that the instruction "load32(a+8)" and the instruction "load32(a+12)" are moved to the basic block 800 and "load32(a+12)" in the basic block 810 is removed.

FIG. 11 shows an example of a result of applying the processing of S230 to a program to be compiled, by use of the result shown in FIG. 10. The program of this example has: a basic block 800 including instructions of first to sixth lines; a basic block 810 including instructions of seventh to ninth lines; and a basic block 820 including instructions of tenth and eleventh lines. As shown in FIG. 11, the common processing instruction group generation unit 130 generates a common processing instruction group, which is indicated by the instructions of the first to third lines and the instruction of the fifth line in FIG. 11, in the basic block 800 in place of the instructions of the first and second lines in FIG. 8. Thereafter, the instruction insertion unit 140 inserts the instructions of the fourth and fifth lines in FIG. 8 into the basic block 820. Accordingly, in the case of executing the course from the basic block 800 to the basic block 810, a 64-bit load instruction is executed once instead of executing a 32-bit load instruction twice. Thus, the instruction execution becomes efficient.

Figure 12:
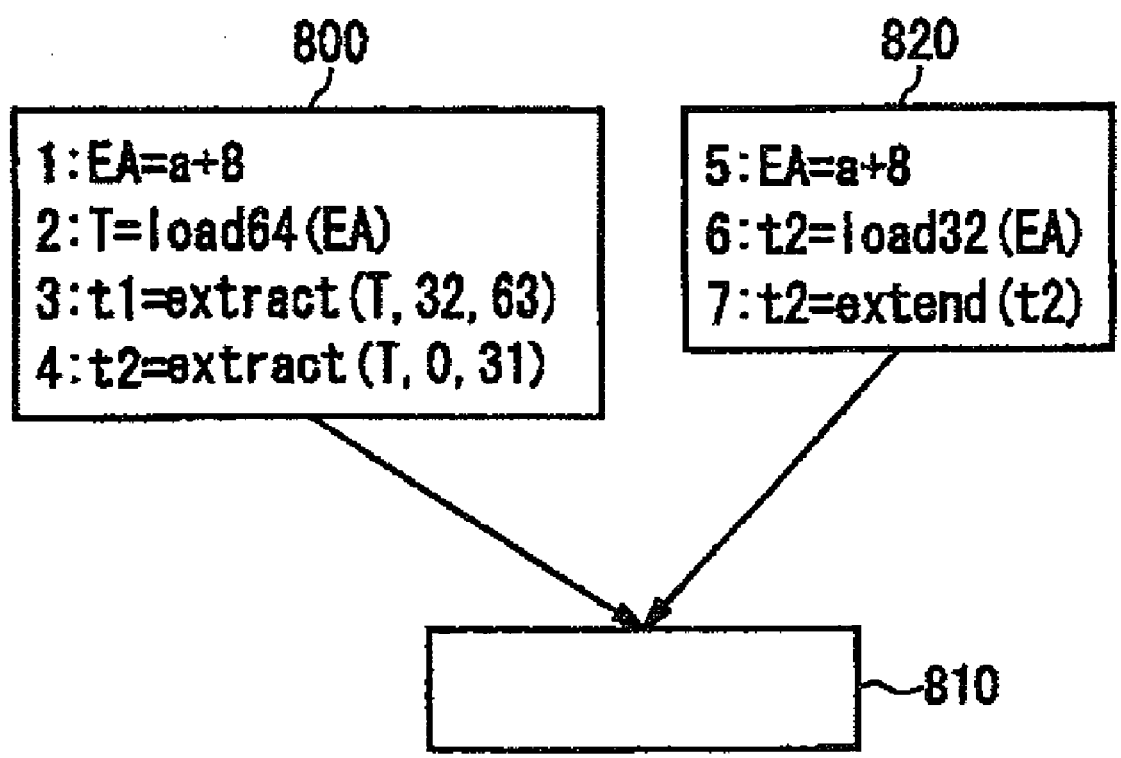
FIG. 12 shows an example of a result of optimizing a program to be compiled.

FIG. 12 shows an example of a result of optimizing a program to be compiled. The program of this example has: a basic block 800 including instructions of first to fourth lines; a basic block 810; and a basic block 820 including instructions of fifth to seventh lines, To be more specific, FIG. 12 shows an example of further executing general optimization, such as removal processing of partial redundancy, copy propagation processing, removal of useless substitute sentence and removal processing of sign extension instruction, for the program shown in FIG. 11. Accordingly, even in the case of executing the conventional optimization processing as it is, the sign extension instruction is explicitly generated in the sixth line of FIG. 11. Thus, the sign extension instruction of the ninth line in FIG. 11 can be properly removed. As a result, by generating a common processing instruction group in the basic block 800, the compiler device 10 can remove instructions from the basic block 810.

Consequently, particularly, in the case where a computer operating this program employs a 64-bit architecture and performs processing handling 32-bit data, as an example, in the case where a program described in the Java JAVA (registered trademark) language is executed in the Intel IA-64 architecture, the compiler device 10 can efficiently operate the program.

FIG. 13 (a) shows an example of a program to be compiled according to a first modified example. The program of this example has: a basic block 1300 which includes instructions of first and second lines and is an example of the first instruction sequence; a basic block 1310 which includes instructions of third and fourth lines and is an example of the second instruction sequence; and a basic block 1320 which is an example of the third instruction sequence. The instructions of the first and second lines are examples of the first instruction and are instructions for reading a floating-point value to a register f1 from an address obtained by adding 12 to a variable a. Moreover, the instructions of the third and fourth lines are examples of the second instruction and are instructions for reading a floating-point value to a register f2 from an address obtained by adding 8 to the variable a.

A processor such as the Intel IA-64 architecture can execute a paired load instruction for loading data by one instruction to two floating-point registers from addresses adjacent to each other on a memory. In order to generate the instruction, when the first instruction of the first and second lines is an instruction for reading first data from the memory and the second instruction of the third and fourth lines is an instruction for reading second data stored in an address different from that of the first data from the memory, the replaceability determination unit 120 determines the first and the second instructions to be replaceable with a common processing instruction group. Moreover, the replaceability determination unit 120 preferably determines the first and second instructions to be replaceable with the common processing instruction group further with the proviso that one of the registers as destinations of the read by the first and second instructions is an odd-number register and the other register is an even-number register.

FIG. 13 (b) shows a result of optimizing the program to be compiled according to the first modified example. The common processing instruction group generation unit 130 generates common processing instructions, as the common processing instruction group, for reading the respective first and second data from the memory and storing values in the respective registers, in the basic block 1300 as an example of the first instruction sequence. Furthermore, the instruction insertion unit 140 inserts the instructions of the third and fourth lines in FIG. 13(a) into the basic block 1320 as an example of the third instruction sequence.

As described above, according to this example, the compiler device 10 can generate a floating-point data load instruction for reading floating-point data to two registers by one instruction, in place of plural instructions for reading floating-point data from the memory.

FIG. 14 (a) shows an example of a program to be compiled according to a second modified example. The program of this example has: a basic block 1400 which includes an instruction of a first line and is an example of the first instruction sequence; a basic block 1410 which includes an instruction of a second line and is an example of the second instruction sequence; and a basic block 1420 as an example of the third instruction sequence. The instruction of the first line is an example of the first instruction and is an instruction for reading a hexadecimal constant 0011A800 into a register r1. Moreover, the instruction of the second line is an example of the second instruction and is an instruction for reading a hexadecimal constant 0001A810 into a register r2.

For example, in the case of reading 32-bit constant data into a register, a computer of the IBM (International Business Machines Cooperation) PowerNP (registered trademark) architecture executes two instructions, each of which reads 16-bit data. Meanwhile, processing of adding data smaller than a predetermined difference to a value already stored in the register can be executed by one instruction. In order to reduce the number of instructions to be executed, the replaceability determination unit 120 determines the first and the second instructions to be replaceable with the common processing instruction group when the first instruction is a group of instructions for storing first constant data of a size loaded by plural instructions in a first register and the second instruction is a group of instructions for storing second constant data, which is within a difference predetermined from the first constant data, in a second register.

FIG. 14 (b) shows a result of optimizing a program to be compiled according to the second modified example. The common processing instruction group generation unit 130 generates, as the common processing instruction group, an instruction of the first line for storing the first constant data in the first register and an instruction of the second line for storing a result of adding the difference between the second constant data and the first constant data to a value of the first register in the second register, in the basic block 1400 as the first instruction sequence. Furthermore, the instruction insertion unit 140 inserts the instruction of the second line in FIG. 14 (a) into the basic block 1420.

As described above, according to this example, the compiler device 10 can generate an instruction for adding a predetermined value to the register already reading the first constant data, in place of a group of instructions for reading the second constant data longer than a predetermined size into the register. The instruction of adding the predetermined value to the register is operated faster than the instruction for reading the second constant data into the register and thus the compiler device 10 can operate the program fast.

FIG. 15 (*a*) shows an example of a program to be compiled according to a third modified example. The program of this example has: a basic block 1500 which includes an instruction of a first line and is an example of the first instruction sequence; a basic block 1510 which includes an instruction of a second line and is an example of the second instruction sequence; and a basic block 1520 as an example of the third instruction sequence. The instruction of the first line is an example of the first instruction and is a shift instruction for shifting a value of a variable a to the right by 16 bits to substitute for the value of a variable t1. Moreover, the instruction of the second line is an example of the second instruction and is a mask instruction for masking lower 16 bits of the variable t1 and substituting the value for a variable t2.

For example, a computer of the IBM (International Business Machines Cooperation) PowerPC (registered trademark) architecture can execute a rotate mask instruction for extracting data of digits within a range specified by a register. In order to generate the instruction, the replaceability determination unit 120 determines the first and the second instructions to be replaceable with the common processing instruction when the first instruction is a shift instruction for shifting data stored in the register and the second instruction is a mask instruction for extracting bits of a predetermined data region.

FIG. 15 (*b*) shows a result of optimizing the program to be compiled according to the third modified example. The common processing instruction group generation unit 130 generates, as the common processing instruction, the rotate mask instruction for extracting the data of digits within the range specified by the register, in the second line of FIG. 15 (*b*). Furthermore, the instruction insertion unit 140 inserts the instruction of the second line in FIG. 15 (*a*) into the basic block 1520. Note that, when the value of the variable t1 is not referred to, the compiler device 10 may further remove the instruction of the first line as dead store by use of a technology of useless substitute sentence deletion.

As described above, according to this example, the compiler device 10 can generate the rotate mask instruction in place of the shift instruction and the mask instruction. An execution time of the respective shift and mask instructions is longer than that of the rotate mask instruction. Thus, the compiler device 10 can operate the program fast.

Note that this example is different from those shown in FIGS. 8 to 14 in that there is a dependency relation in an execution order between the plural instructions replaced with the common processing instruction. Specifically, when a following instruction (for example, the mask instruction) to be executed later is executed following after a preceeding instruction (for example, the shift instruction) to be executed previously, the replaceability determination unit 120 determines the preceeding and following instructions to be replaceable with the common processing instruction group. However, when the preceeding instruction is executed after the following instruction, the replaceability determination unit 120 determines the preceeding and following instructions not to be replaceable with the common processing instruction group. As an example, the replaceability determination unit 120 determines the replaceability assuming that there is a dependency relation between the preceeding instruction and the execution order and that a pseudo-instruction which performs no substantial processing exists in a spot executed immediately before execution of the preceeding instruction.

Figure 16:
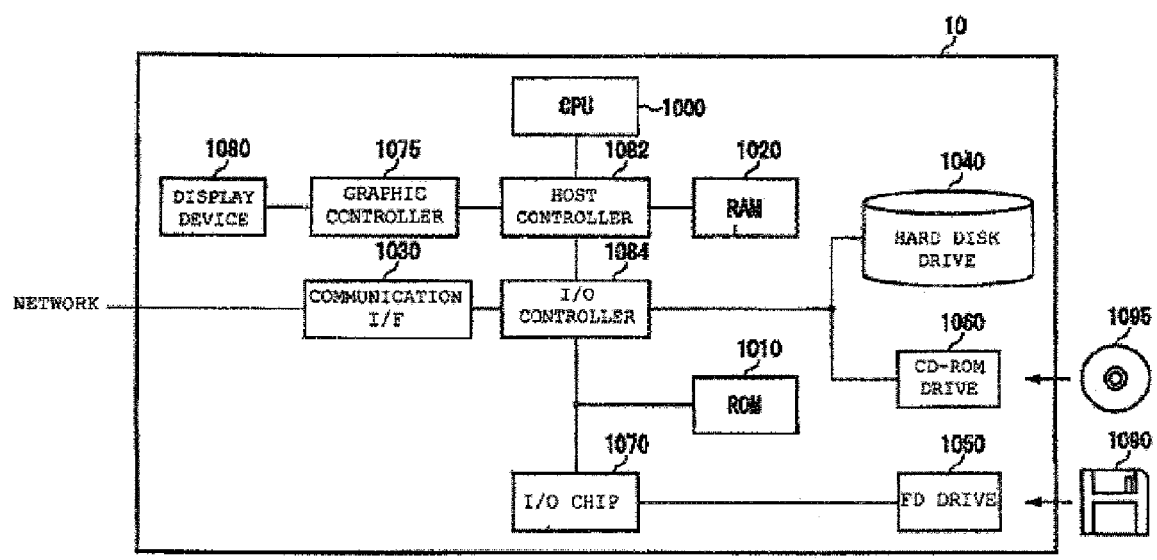
FIG. 16 shows an example of a hardware configuration of the compiler device 10 according to the above-described embodiments or modified examples.

FIG. 16 shows an example of a hardware configuration of the compiler device 10 according to the above-described embodiment or modified examples. The compiler device 10 according to the embodiment or the modified examples includes: a CPU peripheral unit having a CPU 1000, a RAM 1020, a graphic controller 1075 and a display device 1080, which are connected to each other by a host controller 1082; an input/output unit having a communication interface 1030, a hard disk drive 1040 and a CD-ROM drive 1060 which are connected to the host controller 1082 by an input/output controller 1084; and a legacy input/output unit having a ROM 1010, a flexible disk drive 1050 and an input/output chip 1070 which are connected to the input/output controller 1084.

The host controller 1082 connects the RAM 1020, the CPU 1000 accessing the RAM 1020 at a high transmission rate and the graphic controller 1075 to each other. The CPU 1000 operates, based on a compiler program stored in the ROM 1010 and the RAM 1020, and controls the respective units. The graphic controller 1075 obtains image data generated on a frame buffer provided in the RAM 1020 by the CPU 1000 and the like and displays the data on the display device 1080. Alternatively, the graphic controller 1075 may include the frame buffer storing image data generated by the CPU 1000 and the like in the inside thereof.

The input/output controller 1084 connects the host controller 1082, the communication interface 1030 that is a relatively high-speed input/output device, the hard disk drive 1040 and the CD-ROM drive 1060 to each other. The communication interface 1030 communicates with other devices via a network. The hard disk drive 1040 stores the compiler program and data which are used by the compiler device 10. The CD-ROM drive 1060 reads the compiler program or the data from a CD-ROM 1095 and provides the compiler program or the data to the input/output chip 1070 via the RAM 1020.

Moreover, to the input/output controller 1084, the ROM 1010 and relatively low-speed input/output devices such as the flexible disk drive 1050 and the input/output chip 1070 are connected. In the ROM 1010, stored are: a boot program executed by the CPU 1000 when the compiler device 10 is started; a program dependent on the hardware of the compiler device 10; and the like. The flexible disk drive 1050 reads a compiler program or data from a flexible disk 1090 and provides the program or the data to the input/output chip 1070 via the RAM 1020. The input/output chip 1070 connects the flexible disk 1090 and various input/output devices to each other via, for example, a parallel port, a serial port, a keyboard port, a mouse port and the like.

The compiler program provided to the compiler device 10 is stored in a recording medium, such as the flexible disk 1090, the CD-ROM 1095 or an IC card, and is provided by a user. The compiler program is read from the recording medium, installed into the compiler device 10 via the input/output chip 1070 and executed in the compiler device 10.

The compiler program installed into the compiler device 10 and executed therein includes an instruction group generation module, a movable range analysis module, a replaceability determination module, a common processing instruction group generation module, an instruction insertion module and a partial redundancy removal module. Operations which the respective modules press the compiler device 10 to perform are the same as those of the corresponding members in the compiler device 10 described in FIGS. 1 to 15. Thus, description thereof will be omitted.

The above-described compiler program or modules may be stored in an external recording medium. As the recording medium, besides the flexible disk 1090 and the CD-ROM 1095, usable are: an optical recording medium such as a DVD and/or a PD; a magnetooptical recording medium such as an MD; a tape medium; a semiconductor memory such as an IC card; and the like. Moreover, by use of a storage unit such as a hard disk or an RAM, which are provided in a server system connected to a dedicated communication network or the Internet, as the recording medium, the compiler program may be provided to the compiler device 10 via the network.

As is obvious from the above description, when the first instruction is within the movement range of the second instruction, which is analyzed by the busy code motion, the compiler device 10 can convert the first and the second instructions into the common processing instruction group having a shorter execution time or fewer instructions. Thus, while maintaining a state where the second instruction is not redundantly executed, the program can be optimized. Furthermore, in the foregoing processing, the compiler device 10 generates instructions or a set of instruction groups as the bit-vector data structure and thus can perform the calculation of manipulating a set including plural instructions at high-speed. As a result, the compiler device 10 can reduce a processing time required for optimization and thus can be operated as a runtime compiler such as a Java JAVA (registered trademark) Just-In-Time compiler.

The present invention has been described above by use of the embodiment. However, the technical scope of the present invention is not limited to the one described in the foregoing embodiment. Various modifications and improvements can be added to the foregoing embodiment. It is apparent from the description of claims that embodiments to which such modifications or improvements are added can be also included in the technical scope of the present invention.

According to the above-described embodiment and modified examples, a compiler device, a compiling method, a compiler program and a recording medium, all of which will be described in the following items, are realized.

(Article 1) A compiler device which optimizes a program by changing an order of executing instructions, including:
a replaceability determination unit which determines whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together; a common processing instruction group generation unit which generates a common processing instruction group in the first instruction sequence, in place of the first instruction, when the replaceability determination unit determines the first and the second instructions to be replaceable; and an instruction insertion unit which inserts the second instruction into a third instruction sequence that is an instruction sequence other than the first instruction sequence and is executed before the second instruction sequence.

(Article 2) The compiler device of Article 1, wherein the replaceability determination unit determines the first and the second instructions to be replaceable with the common processing instruction group when the number of instructions in the common processing instruction group is smaller than the number of instructions in the case of executing the first and the second instructions separately.

(Article 3) The compiler device of Article 1, wherein the replaceability determination unit determines the first and the second instructions to be replaceable with the common processing instruction group when an execution time required for executing the common processing instruction group from its start till its end is shorter than an execution time required in the case of executing the first and the second instructions separately.

(Article 4) The compiler device of Article 1, wherein the replaceability determination unit determines the first and the second instructions to be replaceable with the common processing instruction group when the first instruction is an instruction for reading first data from a memory, the second instruction is an instruction for reading, from the memory, second data stored in an address different from that of the first data and the first and second data can be read by one instruction, and the common processing instruction group generation unit generates, as the common processing instruction group, the common processing instruction for reading the first and the second data from the memory by one instruction, a first extraction instruction for extracting the first data from data read by the common processing instruction and a second extraction instruction for extracting the second data from data read by the common processing instruction, in the first instruction sequence.

(Article 5) The compiler device of Article 4, wherein the common processing instruction group generation unit generates, as the common processing instruction group, the common processing instruction, the first extraction instruction for further performing sign extension for extracted data, the second extraction instruction for further performing sign extension for extracted data and a sign extension instruction for performing sign extension of the data extracted by the second extraction instruction.

(Article 6) The compiler device of Article 4, wherein the common processing instruction group generation unit generates, as the common processing instruction group, the common processing instruction, the first extraction instruction for further performing zero extension for extracted data, the second extraction instruction for further performing zero extension for extracted data and a zero extension instruction for performing zero extension of the data extracted by the second extraction instruction.

(Article 7) The compiler device of Article 2, wherein the replaceability determination unit determines the first and the second instructions to be replaceable with the common processing instruction group when the first instruction is an instruction for reading first data from a memory and the second instruction is an instruction for reading, from the memory, second data stored in an address different from that of the first data, and
the common processing instruction group generation unit generates, as the common processing instruction group, the common processing instruction for reading the respective first and the second data from the memory and storing values in two registers, respectively, in the first instruction sequence.

(Article 8) The compiler device of Article 1, wherein the replaceability determination unit determines the first and the second instructions to be replaceable with the common processing instruction group when the first instruction is a group of instructions for storing first constant data of a size loaded by plural instructions in a first register and the second instruction is a group of instructions for storing second constant data in a second register within a difference predetermined from the first constant data and
the common processing instruction group generation unit generates, as the common processing instruction group, an instruction for storing the first constant data in the first register and an instruction for storing, in the second register, a result obtained by adding the difference between the second constant data and the first constant data to a value of the first register, both of the instructions being generated in the first instruction sequence.

(Article 9) The compiler device of Article 1, wherein the replaceability determination unit determines the first and second instructions to be replaceable with the common processing instruction when the first instruction is a shift instruction for shifting data stored in a register and the second instruction is a mask instruction for extracting bits of a predetermined data region, and the common processing instruction group generation unit generates, as the common processing instruction, a rotate mask instruction for extracting data of digits within a range specified by the register, the rotate mask instruction being generated in the first instruction sequence.

(Article 10) The compiler device of Article 1, wherein the replaceability determination unit determines the first and second instructions to be replaceable with the common processing instruction group when a range within which the second instruction can be moved while guaranteeing the same execution result of the program overlaps with a range within which the first instruction can be moved while guaranteeing the same execution result of the program.

(Article 11) The compiler device of Article 10, further including a movable range analysis unit for analyzing a movement range of the second instruction, within which the second instruction can be moved while obtaining the same execution result of the program without increasing the number of executions of the second instruction, wherein the replaceability determination unit determines the first and the second instructions to be replaceable with the common processing instruction group when the first instruction is within the movement range analyzed by the movable range analysis unit, the common processing instruction group generation unit generates, in place of the first instruction, the common processing instruction group in the first instruction sequence when the common processing instruction group is determined by the replaceability determination unit to be replaceable with the first instruction, and when the replaceability determination unit determines the second instruction not to be replaceable, the instruction insertion unit moves the second instruction to a spot within the range analyzed by the movable range analysis unit, the spot having a minimum live range of values generated by the second instruction.

(Article 12) A compiling method for optimizing a program by changing an order of executing instruction, the method including:

a replaceability determination step of determining whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together;

a common processing instruction group generation step of generating the common processing instruction group in the first instruction sequence, in place of the first instruction, when the replaceability determination step determines the first and second instructions to be replaceable; and an instruction insertion step of inserting the second instruction into a third instruction sequence that is an instruction sequence other than the first instruction sequence and is executed before the second instruction sequence.

(Article 13) A compiler program for allowing a computer to function as a compiler device which optimizes a program by changing an order of executing instruction, the program allowing the computer to function as:

a replaceability determination unit which determines whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together; a common processing instruction group generation unit which generates a common processing instruction group in the first instruction sequence, in place of the first instruction, when the replaceability determination unit determines the first and the second instructions to be replaceable; and an instruction insertion unit which inserts the second instruction into a third instruction sequence that is an instruction sequence other than the first instruction sequence and is executed before the second instruction sequence.

(Article 14) The compiler program of Article 13, wherein the replaceability determination unit determines the first and second instructions to be replaceable with the common processing instruction group when an execution time required for executing the common processing instruction group from its start till its end is shorter than an execution time required in the case of executing the first and the second instructions separately.

(Article 15) The compiler program of Article 13, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and second data can be read by one instruction, and the common processing instruction group generation unit generates, as the common processing instruction group, the common processing instruction for reading the first and the second data from the memory by one instruction, a first extraction instruction for extracting the first data from data read by the common processing instruction and a second extraction instruction for extracting the second data from the data read by the common processing instruction, in the first instruction sequence.

(Article 16) A recording medium recording the compiler program of any one of Articles 13 to 15.

As described above, it is clear that according to the present invention, a program can be optimized by changing an order of executing instructions.

Although the preferred embodiment and modified examples have been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer functioning as a compiler device to optimize a program by changing an order of executing instructions, said compiler device comprising:

a movable range analysis unit to analyze an instruction movable range within which the instructions can be moved while obtaining an execution result of the program without increasing a number of times of executing the instructions;

a replaceability determination unit to determine whether or not a first instruction included in a first instruction sequence and a second instruction included in a second instruction sequence executed after the first instruction sequence can be replaced with a common processing instruction group including a common processing instruction for processing at least respective parts of processings by the first and second instructions together, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and the second data can be read by one instruction;

a common processing instruction group generation unit to generate a common processing instruction group in the first instruction sequence, in place of the first instruction, when the replaceability determination unit determines the first and second instructions to be replaceable; and an instruction insertion unit to insert the second instruction into a third instruction sequence that is an instruction sequence other than the first instruction sequence and is executed before the second instruction sequence.

2. The compiler device of claim 1, wherein the replaceability determination unit determines the first and second instructions to be replaceable with the common processing instruction group when the number of instructions in the common processing instruction group is smaller than the number of instructions in the case of executing the first and second instructions separately.

3. The compiler device of claim 1, wherein the replaceability determination unit determines the first and second instructions to be replaceable with the common processing instruction group when an execution time required for executing the common processing instruction group from its start till its end is shorter than an execution time required in the case of executing the first and second instructions separately.

4. The compiler device of claim 1, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and the second data can be read by one instruction, and the common processing instruction group generation unit generates, as the common processing instruction group, a common processing instruction for reading the first and the second data from the memory by one instruction, a first extraction instruction for extracting the first data from data read by the common processing instruction and a second extraction instruction for extracting the second data from the data read by the common processing instruction, in the first instruction sequence.

5. The compiler device of claim 4, wherein the common processing instruction group generation unit generates, as the common processing instruction group, the common processing instruction, the first extraction instruction for further performing sign extension for extracted data and the second extraction instruction for further performing sign extension for extracted data and a sign extension instruction for performing sign extension of the data extracted by the second extraction instruction.

6. The compiler device of claim 4, wherein the common processing instruction group generation unit generates, as the common processing instruction group, the common processing instruction, the first extraction instruction for further performing zero extension for extracted data and the second extraction instruction for further performing zero extension for extracted data and a zero extension instruction for performing zero extension of the data extracted by the second extraction instruction.

7. The compiler device of claim 2, wherein the replaceability determination unit determines the first and second instructions to be replaceable with the common processing instruction group when the first instruction is an instruction for reading first data from a memory and the second instruction is an instruction for reading, from the memory, second data stored in an address different from that of the first data, and the common processing instruction group generation unit generates, as the common processing instruction group, the common processing instruction for reading the respective first and second data from the memory and storing values in two registers, respectively, in the first instruction sequence.

8. The compiler device of claim 1, wherein the replaceability determination unit determines the first and the second instructions to be replaceable with the common processing instruction group when the first instruction is a group of instructions for storing first constant data of a size loaded by plural instructions in a first register and the second instruction is a group of instructions for storing second constant data in a second register within a difference predetermined from the first constant data, and the common processing instruction group generation unit generates, as the common processing instruction group, an instruction for storing the first constant data in the first register and an instruction for storing, in the second register, a result obtained by adding the difference between the second constant data and the first constant data to a value of the first register, both of the instructions being generated in the first instruction sequence.

9. The compiler device of claim 1, wherein the replaceability determination unit determines the first and second instructions to be replaceable with the common processing instruction when the first instruction is a shift instruction for shifting data stored in a register and the second instruction is a mask instruction for extracting bits of a predetermined data region, and the common processing instruction group generation unit generates, as the common processing instruction, a rotate mask instruction for extracting data of digits within a range specified by the register, the rotate mask instruction being generated in the first instruction sequence.

10. The compiler device of claim 1, wherein the replaceability determination unit determines the first and second instructions to be replaceable with the common processing instruction group when a range, within which the second instruction can be moved while guaranteeing the same execution result of the program, overlaps with a range within which the first instruction can be moved while guaranteeing the same execution result of the program.

11. The compiler device of claim 10, further comprising a movable range analysis unit for analyzing a movement range of the second instruction, within which the second instruction can be moved while obtaining the same execution result of the program without increasing the number of times of executions of the second instruction, wherein the replaceability determination unit determines the first and the second instructions to be replaceable with the common processing instruction group when the first instruction is within the movement range analyzed by the movable range analysis unit, the common processing instruction group generation unit generates, in place of the first instruction, the common processing instruction group in the first instruction sequence when the common processing instruction group is determined by the replaceability determination unit to be replaceable with the first instruction, and when the replaceability determination unit determines the second instruction not to be replaceable, the instruction insertion unit moves the second instruction to a spot within the range analyzed by the movable range analysis unit, the spot having a minimum live range of values generated by the second instruction.

12. A computer program product comprising a computer usable medium having computer readable program code means embodied therein for causing optimization of a program by changing an order of executing instruction, the computer readable program code means in said computer program product comprising computer readable program code means for causing a computer to effect the functions of claim 1.

13. A program storage device readable by machine, tangibly embodying a program of instructions executable by the machine for allowing a computer to function as a compiler device to optimize a program by changing an order of executing instruction, the program allowing the computer to function as:
 a movable range analysis unit to analyze an instruction movable range within which the instructions can be moved while obtaining an execution result of the program without increasing a number of times of executing the instructions;
 a replaceability determination unit to determine whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and the second data can be read by one instruction;
 a common processing instruction group generation unit to generate a common processing instruction group in the first instruction sequence, in place of the first instruction, when the replaceability determination unit determines the first and second instructions to be replaceable; and an instruction insertion unit to insert the second instruction into a third instruction sequence that is an instruction sequence other than the first instruction sequence and is executed before the second instruction sequence.

14. The program storage device of claim 13, wherein the replaceability determination unit determines the first and the second instructions to be replaceable with the common processing instruction group when an execution time required for executing the common processing instruction group from its start till its end is shorter than an execution time required in the case of executing the first and the second instructions separately.

15. The program storage device of claim 13, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and second data can be read by one instruction, and the common processing instruction group generation unit generates, as the common processing instruction group, the common processing instruction for reading the first and the second data from the memory by one instruction, a first extraction instruction for extracting the first data from data read by the common processing instruction and a second extraction instruction for extracting the second data from the data read by the common processing instruction, in the first instruction sequence.

16. A recording medium recording the program of instructions of claim 13.

17. A computer program product comprising a computer usable medium having computer readable program code means embodied therein for causing optimization of a program by changing an order of executing instruction, the computer readable program code means in said computer program product comprising computer readable program code means for causing a computer to effect the functions of claim 13.

18. An article of manufacture comprising a computer usable medium having computer readable program code means embodied therein for causing optimization of a program by changing an order of executing instruction, the computer readable program code means in said article of manufacture comprising computer readable program code means for causing a computer to effect the steps of:

a movable range analysis step of analyzing an instruction movable range within which the instructions can be moved while obtaining an execution result of the program without increasing a number of times of executing the instructions;

a replaceability determination step of determining whether or not a first instruction included in a first instruction sequence and a second instruction included in a second instruction sequence executed after the first instruction sequence can be replaced with a common processing instruction group including a common processing instruction for processing at least respective parts of processings by the first and the second instructions together, wherein the replaceability determination unit determines the first and second instructions to be replaceable with the common processing instruction group when the first instruction is an instruction for reading first data from a memory, the second instruction is an instruction for reading, from the memory, second data stored in an address different from that of the first data and the first and the second data can be read by one instruction;

a common processing instruction group generation step of generating the common processing instruction group in the first instruction sequence, in place of the first instruction, when the replaceability determination step determines the first and second instructions to be replaceable; and an instruction insertion step of inserting the second instruction into a third instruction sequence that is an instruction sequence other than the first instruction sequence and is executed before the second instruction sequence.

19. A program storage device readable by machine, tangibly embodying a program of instructions executable by the machine to perform method steps for optimizing a program by changing an order of executing instruction, said method steps comprising the steps of claim 18.

* * * * *